No. 787,364. PATENTED APR. 18, 1905.
P. H. FONTAINE.
THILL TUG.
APPLICATION FILED DEC. 4, 1903.
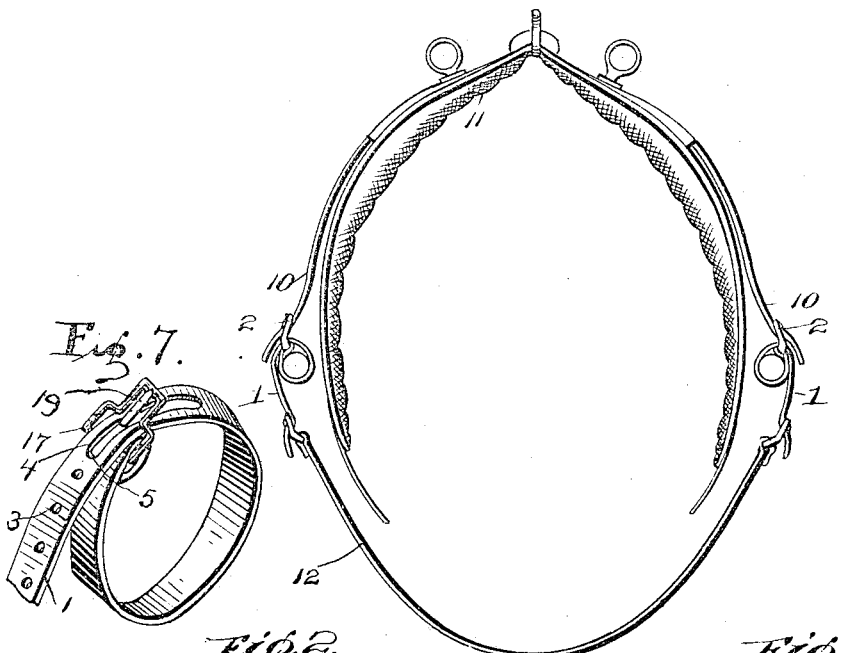
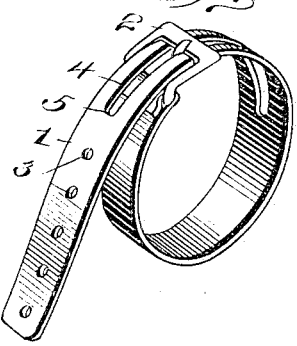
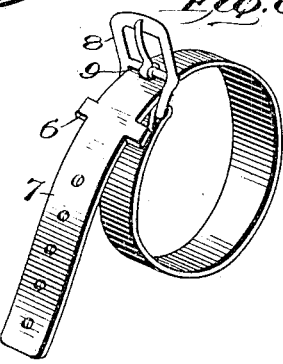
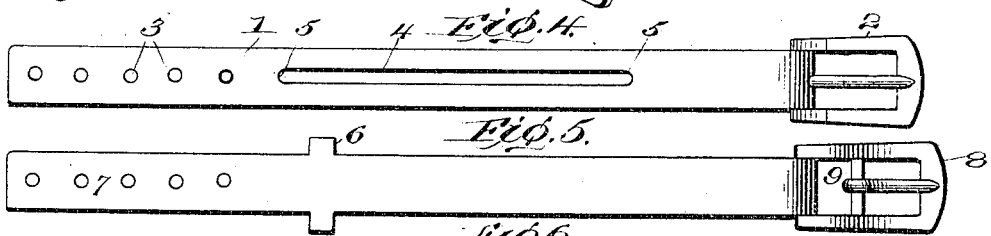
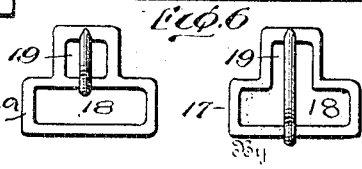
Witnesses
J. M. Fowler Jr.
William T. Jones
Inventor
Patrick H. Fontaine
by
Mason, Fenwick & Lawrence
his Attorneys No. 787,364.                                    Patented April 18, 1905.

UNITED STATES PATENT OFFICE.

PATRICK H. FONTAINE, OF BETHEL HILL, NORTH CAROLINA.

THILL-TUG.

SPECIFICATION forming part of Letters Patent No. 787,364, dated April 18, 1905.

Application filed December 4, 1903. Serial No. 183,796.

*To all whom it may concern:*

Be it known that I, PATRICK H. FONTAINE, a citizen of the United States, residing at Bethel Hill, in the county of Person and State of North Carolina, have invented certain new and useful Improvements in Thill-Tugs; and I do hereby declare the following to be a full, clear, and exact description of the invention, such as will enable others skilled in the art to which it appertains to make and use the same.

My invention relates to improvements in thill-tugs; and the objects of the invention are, first, the production of a tug which is very simple in its construction and operation and cheap in its production; second, the production of a tug which can be made to tightly grip the shaft or thill, and, third, the construction of a tug which can be tightened or loosened on both shafts simultaneously by an operator standing on one side of the horse.

A further object of the invention is to provide a thill or shaft support with means adapted to tightly grip the shaft or thill when the same is assembled with a harness-saddle and its girth which are carried by a horse in their normal position and said horse and vehicle to which the shafts are secured are descending an inclined surface. I have found from experience that the gripping means formed upon the thill-support will when a horse carrying the same is descending a hill grip the shafts, owing to the fact that the saddle, support, and girth change their positions upon the horse.

A still further object of the invention is to construct a tug which is provided with a loop the dimension of which is capable of being automatically increased or decreased when assembled with the girth and saddle of a harness for the purpose of preventing injury to the horse's back when mounted thereon. Owing to the shifting of a harness-saddle upon a horse if there is not permitted some expansion of the girth the saddle is liable to injure the horse's back, and for this reason such injury to the horse is entirely obviated by the employment of a tug constructed in accordance with my invention, as there is practically produced by my construction a girth which acts as if it were elastic.

To accomplish these objects, the invention consists, first, of a tug constructed of a billet attached to a buckle and formed into a slip tug-loop, whereby the size of the loop can be instantly reduced by pulling on the end of the billet, the construction and arrangement being such that by attaching the free end of one of the billets to a girth and passing the free end of the billet of the other tug-loop through a buckle on the opposite end of the girth and pulling on the billet and girth the loops of both tugs will be drawn up tightly around the thills and held in such position by passing the tongue of the buckle through one of the adjusting-apertures in the end of the girth, the construction and arrangement also permitting the size of the tug-loops to be instantly increased to permit the removal of the thills when desired by simply detaching one of the billet-loops from the girth, the weight of the thill automatically enlarging the loop.

The invention also consists in other details of constructions and arrangements of parts, as will be hereinafter described and specifically claimed.

In the accompanying drawings, Figure 1 is a side elevation of a harness saddle and girth with my improved thill-tugs applied thereto, the thills being shown in position within the tugs. Fig. 2 is a detail perspective view of one form of my invention. Fig. 3 is a perspective view of a modified form of my construction. Fig. 4 is a top plan view of my improved tug strap and buckle before being formed into a tug, the same illustrating the construction shown in Fig. 2. Fig. 5 is a similar view showing the construction of tug as illustrated in Fig. 3. Fig. 6 represents modified forms of buckles which are attached to the tug-straps. Fig. 7 is a view similar to Fig. 2, except in this figure I employ a differently-constructed buckle.

1 in the drawings represents a billet or strap, at or near one end of which is attached a buckle 2. The strap is provided with a plurality of adjusting-holes 3 and with means for limiting the size of the tug-loop. In Fig. 2 this means consists of an elongated slot 4, through which the tongue of the buckle is designed to pass and to operate in the same, the extreme limit of the size of the loop being determined by the tongue of the buckle coming in contact with the end wall 5 of the slot.

In Fig. 3 the means for regulating or determining the size of the tug-loop consists of a shoulder or enlargement 6, provided on the strap. To form the billet or strap into a tug, as shown in Fig. 2, all that is necessary is to pass the free end of the strap shown in Fig. 4 through the buckle until the tongue thereof engages the elongated slot 4 and continuing to pull on the strap until the thill is tightly inclosed within the loop.

In forming the tug from the construction shown in Fig. 3 the strap 7 is provided with a double buckle 8, and the loose end of the strap is passed through an aperture 9 in said buckle, the opening 9 in said buckle being sufficiently large to permit the shoulder or enlargement 6 on the strap to pass through the same by twisting the strap. When the billet or strap 1 has been formed into a tug, as shown in Fig. 2 or 3, the same is attached to the supporting-strap 10 of a harness-saddle 11, as clearly shown in Fig. 1, one on each side of the saddle, and will form a fixed attachment for the saddle.

When it is desired to secure the tugs to the thills of a vehicle, the thills are passed through the tug-loops and the free end of the strap of one of the tugs is attached to a girth 12, and the free end of the strap of the other tug-loop is passed through a buckle on the opposite end of the girth, and by pulling upward on this free end of the tug-loop strap the girth will be tightened and both tug-loops will be simultaneously drawn up and tightened around the thills, and by passing the tongue of the buckle on the girth through one of the adjusting-holes in the tug-loop strap the tugs will be held tightly around the thills and will prevent the latter from having a loose sidewise or an up-and-down movement. When it is desired to detach the horse, the tug-loops can be simultaneously and instantly increased in size, so as to permit the ready removal of the thills by unfastening the buckle on the end of the girth, by reason of which the weight of the thills will cause the strap to slip until stopped by the limiting means provided for that purpose, so that the thills can be readily drawn out. This is a very important feature of my invention for the reason that it often happens that where tight tugs are employed a horse becoming frightened before the thills are unloosened on both sides and running away causes a great deal of damage to the vehicle, whereas with the employment of my invention by undoing the girth on one side both tugs are enlarged in size so as to permit the thills to readily come out of the same. It is obvious that the limiting means, as shown in Fig. 3, might be formed by having the strap broader at this point, as shown in the drawings, or by attaching a separate piece of leather, metal, or other material thereto by riveting, sewing, or otherwise, so as to form a stop, the spirit of the invention being the same in both instances—namely, the formation of the limiting means on a strap in such manner that it will come directly in contact with the buckle itself, and this is true in the construction shown in Fig. 2, where an elongated slot is shown.

In Fig. 6 I have shown two modified forms of buckles, which I prefer using in connection with my invention for the reason that they enable me to employ a strap or billet for the tug wider than the tug-supporting strap carried by the harness-saddle. In these buckles, which are numbered 17 and 17$^a$, respectively, in the drawings, the lower portions thereof are enlarged, as at 18, for the reception of such enlarged tug-strap, and the upper portions 19 of said buckles are designed for the supporting-strap of ordinary size attached to the harness-saddle, to which the tug-strap is attached. I do not wish, however, to limit myself to these forms of buckles.

From the foregoing description it will be obvious that owing to the shifting of the position of a harness which is provided with my tug upon a horse when going down an incline the tugs are caused to automatically grip the shafts of the vehicle and prevent any injury to the horse or vehicle which may arise by reason of the breaking of the breeching. Furthermore, my improved tugs retain the shafts always in a correct position, not permitting the same to fly upward or wabble sidewise. The present construction of a tug facilitates the hitching or unhitching, as the operator can stand on one side of the horse and tighten or loosen both tugs synchronously.

In Fig. 7 I have shown the straps 1 retained in a looped position by means of the buckle 17, which is depicted in Fig. 6, the portion of the strap extending through said buckle being positioned within the enlarged portion of the same.

Having thus fully described my invention, what I claim as new, and desire to secure by Letters Patent, is—

1. A support, comprising a looped member provided with fastening means secured at one end thereof, and means formed upon said member permitting of automatic sliding adjustment thereof and adapted to engage said fastening means for limiting the movement of the looped member.

2. A thill-tug, comprising a strap or billet bent upon itself to form a loop, in combination with a buckle secured to one end portion of said billet, the opposite end of said billet being normally free for engagement with a girth, and the portions thereof intermediate its ends being provided with a stop to arbitrarily determine the maximum size of said loop.

3. A thill-tug, comprising a billet or strap provided with a terminal buckle, said strap having an elongated slot in its body portion, said body portion having a plurality of adjusting-apertures, and said strap being formed into a loop and having its free end passed through the buckle with the tongue of said buckle engaging said slot.

4. A thill-tug, comprising a billet or strap provided at one end with a buckle, said buckle enlarged at its lower end to receive said billet or strap, thereby permitting of the formation of a loop thereon, and said strap being provided in its body portion with means for limiting the maximum size of said loop.

5. A tug, comprising a billet or strap having an elongated slot and provided at one end with fastening means, and said strap being formed into a loop and having its end passed through the fastening means with a portion of the same engaging said slotted portion of the strap, thereby permitting a sliding adjustment of said strap for controlling the size of the loop formed thereon.

In testimony whereof I hereunto affix my signature in presence of two witnesses.

PATRICK H. FONTAINE.

Witnesses:
   EDWARD T. FENWICK,
   EDGAR M. KITCHIN.